United States Patent
Barrows

(10) Patent No.: US 11,078,883 B2
(45) Date of Patent: Aug. 3, 2021

(54) WIND TURBINE BLADE WITH UNCOUPLED TRAILING EDGE

(71) Applicant: Michael L. Barrows, Newport News, VA (US)

(72) Inventor: Michael L. Barrows, Newport News, VA (US)

( * ) Notice: Subject to any disclaimer, the term of this patent is extended or adjusted under 35 U.S.C. 154(b) by 0 days.

(21) Appl. No.: 16/595,745

(22) Filed: Oct. 8, 2019

(65) Prior Publication Data

US 2021/0102524 A1    Apr. 8, 2021

(51) Int. Cl.
  *F03D 1/06* (2006.01)
  *F01D 5/18* (2006.01)
  *F01D 5/14* (2006.01)

(52) U.S. Cl.
  CPC ........... *F03D 1/0675* (2013.01); *F01D 5/147* (2013.01); *F01D 5/18* (2013.01); *F03D 1/0691* (2013.01)

(58) Field of Classification Search
  CPC .... F03D 1/0633; F03D 1/0641; F03D 1/0691; F03D 1/0675; F01D 5/18; F01D 5/147
  See application file for complete search history.

(56) References Cited

U.S. PATENT DOCUMENTS

| | | | | |
|---|---|---|---|---|
| 4,364,708 A | * | 12/1982 | David | F03D 7/0224 416/132 B |
| 4,456,429 A | * | 6/1984 | Kelland | F03D 7/06 416/117 |
| 9,803,617 B2 | * | 10/2017 | Merzhaeuser | F03D 1/0675 |
| 9,945,357 B2 | * | 4/2018 | Enevoldsen | F03D 1/065 |
| 2003/0077178 A1 | * | 4/2003 | Stearns | F03D 1/0675 416/223 R |
| 2010/0296940 A1 | * | 11/2010 | Zuteck | F03D 1/0683 416/226 |
| 2012/0093627 A1 | * | 4/2012 | Christenson | F03D 1/0675 415/1 |
| 2013/0094970 A1 | * | 4/2013 | Fukami | F03D 1/0633 416/223 R |
| 2018/0142670 A1 | * | 5/2018 | Garm | F03D 1/0641 |

* cited by examiner

*Primary Examiner* — Courtney D Heinle
*Assistant Examiner* — Andrew Thanh Bui
(74) *Attorney, Agent, or Firm* — Peter J. Van Bergen

(57) ABSTRACT

A blade for a wind turbine has a hollow or exoskeleton blade body. The blade body has a leading edge and a trailing edge along a span thereof. The blade body includes a first blade portion and a second blade portion wherein the first blade portion and the second blade portion are integrated with one another along at least 90% of the leading edge, and are in uncoupled contact at the trailing edge. The uncoupled contact permits the first blade portion and second blade portion to experience relative movement at the trailing edge when the blade body twists.

14 Claims, 4 Drawing Sheets

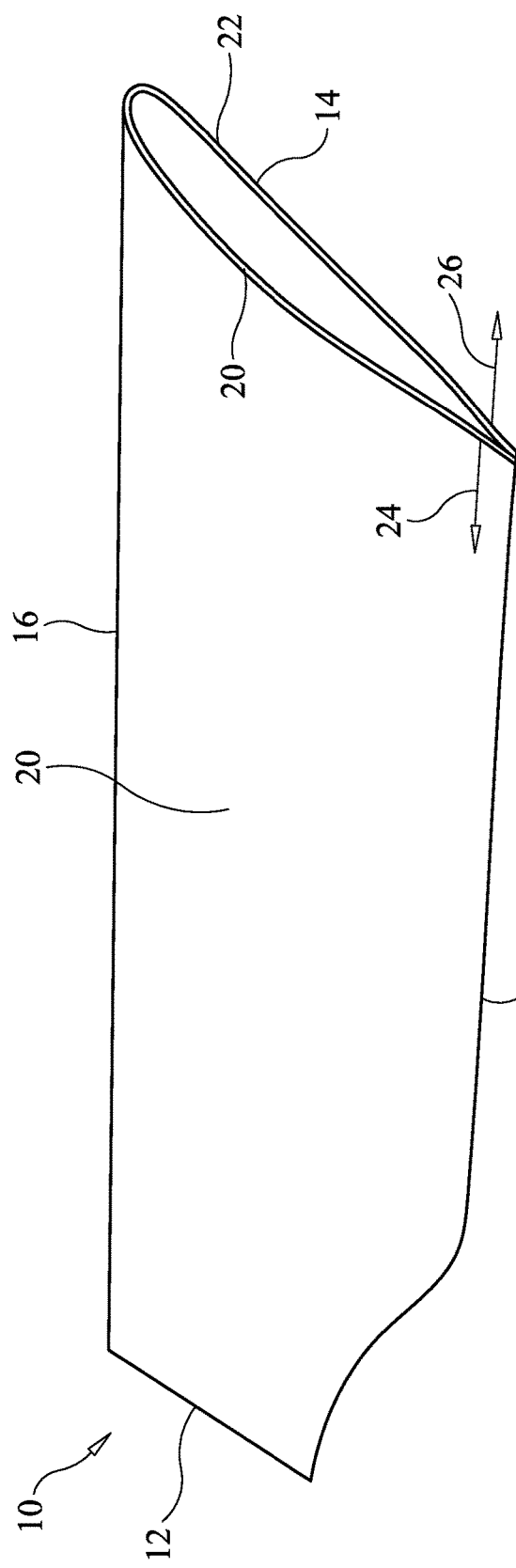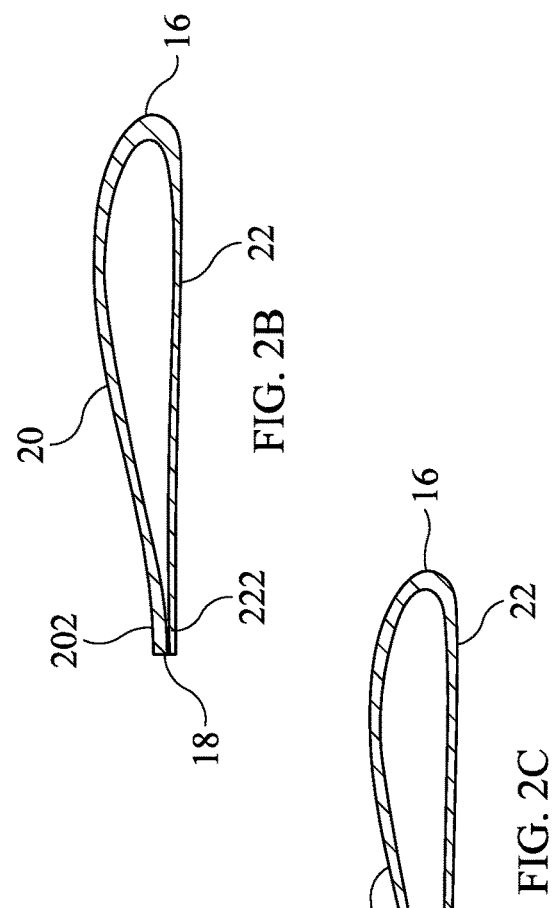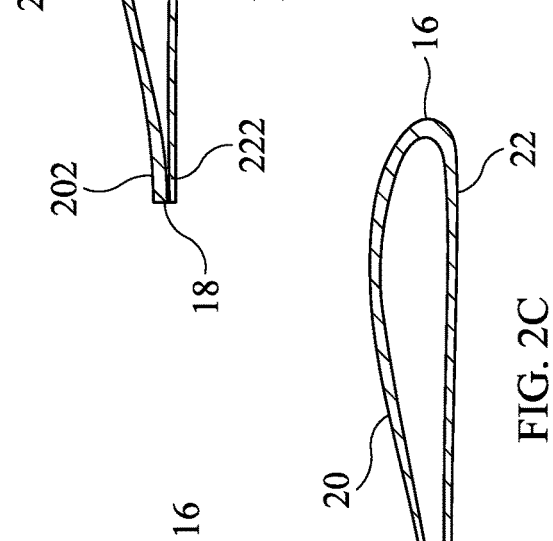

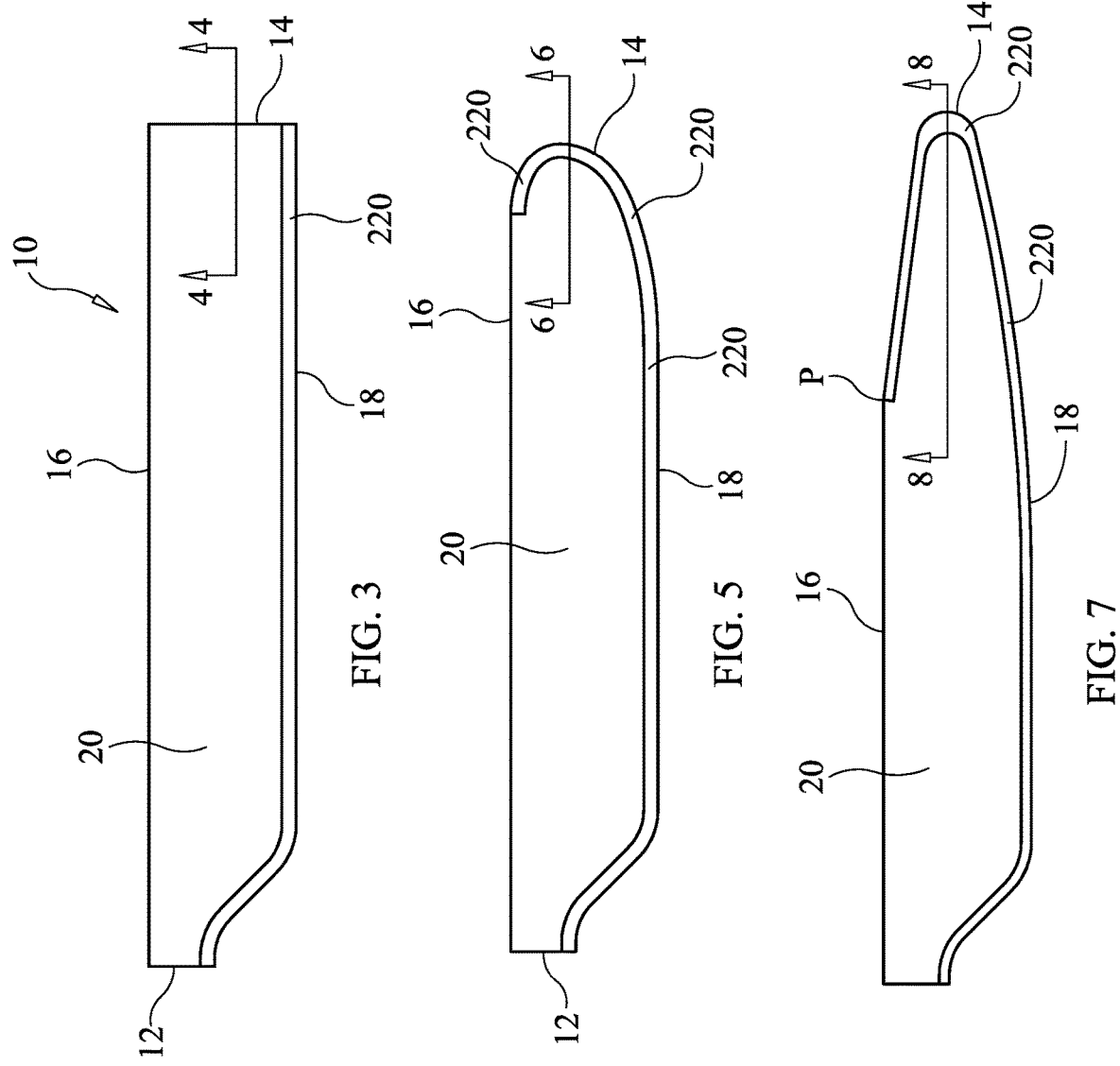

WIND TURBINE BLADE WITH UNCOUPLED TRAILING EDGE

FIELD OF THE INVENTION

The invention relates generally to wind turbine blades, and more particularly to a hollow-body wind turbine blade having an uncoupled trailing edge such that the high and low pressure sides of the blade can move relative to one another when the blade twists.

BACKGROUND OF THE INVENTION

Rotor blade systems are an integral part of wind turbine generators where rotor blades coupled to a tower-mounted hub are designed to convert wind energy into rotational energy to drive a turbine coupled to the tower-mounted hub to thereby generate electrical energy. In terms of horizontal-axis wind turbines, rotor blades generally rotate in a stationary plane that is approximately perpendicular to a ground surface above which the rotor blades are deployed. The rotor blades of a wind turbine span large distances on the order of 40-50 meters. For efficient energy generation, these large spanning blades need to generate as much rotational torque as possible for a variety of wind conditions. To make this result possible, the pitch angle of a wind turbine's rotor blades should be adjusted for aerodynamic efficiently as each rotor blade traverses each rotation about its hub. While the pitch angle of rotor blades can be adjusted by active devices coupled to a rotor blade, the use of such active devices complicates the overall rotor blade system, adds to the weight of the rotor blades, and adds to the overall cost of the rotor blade system.

SUMMARY OF THE INVENTION

Accordingly, it is an object of the present invention to provide a wind turbine blade.

Another object of the present invention is to provide a wind turbine blade that can passively generate rotational torque over a range of wind speeds.

Still another object of the present invention is to provide a wind turbine blade that is lightweight.

Other objects and advantages of the present invention will become more obvious hereinafter in the specification and drawings.

In accordance with the present invention, a blade for a wind turbine has a hollow or exoskeleton blade body with a leading edge and a trailing edge extending along a span of the blade body. The blade body includes a first blade portion and a second blade portion wherein the first blade portion and the second blade portion are integrated with one another along at least 90% of the leading edge, and are in uncoupled contact at the trailing edge. The uncoupled contact permits the first blade portion and second blade portion to experience relative movement at the trailing edge when the blade body twists.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a perspective view of an exoskeleton or hollow-body wind turbine blade in accordance with an embodiment of the present invention;

FIG. 2A is a cross-sectional view of a hollow-body wind turbine blade illustrating a trailing edge configuration in accordance with an embodiment of the present invention;

FIG. 2B is a cross-sectional view of a hollow-body wind turbine blade illustrating a trailing edge configuration in accordance with another embodiment of the present invention;

FIG. 2C is a cross-sectional view of a hollow-body wind turbine blade illustrating a trailing edge configuration in accordance with still another embodiment of the present invention;

FIG. 3 is a plan view of a hollow-body wind turbine blade in accordance with an embodiment of the present invention;

FIG. 4 is a perspective cut away view of the blade's tip region taken along line 4-4 in FIG. 3;

FIG. 5 is a plan view of a hollow-body wind turbine in accordance with another embodiment of the present invention;

FIG. 6 is a perspective cut away view of the blade's tip region taken along line 6-6 in FIG. 5;

FIG. 7 is a plan view of a hollow body wind turbine blade in accordance with still another embodiment of the present invention;

FIG. 8 is a perspective cut away view of the blade's tip region taken along line 8-8 in FIG. 7;

DETAILED DESCRIPTION OF THE INVENTION

Figure 9:
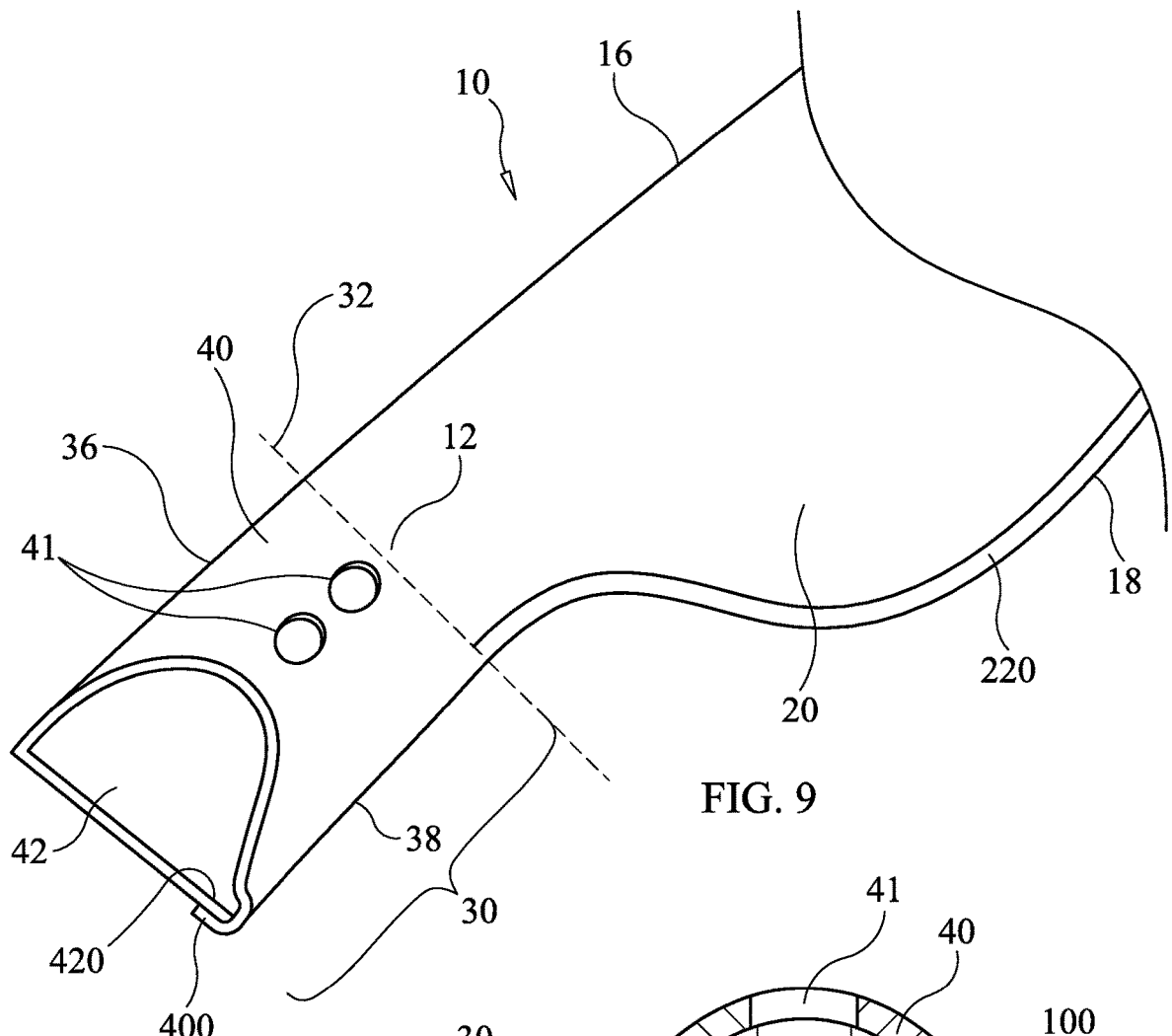
FIG. 9 is a perspective view of the root portion of a hollow-body wind turbine blade coupled to a hollow-mounting support in accordance with an embodiment of the present invention.

Referring now to the drawings and more particularly to FIG. 1, an exoskeleton or hollow-body wind turbine blade in accordance with an embodiment of the present invention is shown and is referenced generally by numeral 10. As is well-understood in the art, blade 10 spans from a root 12 to a tip 14 with root 12 being adapted to be coupled to a wind turbine's hub (not shown). Blade 10 has a leading edge 16 and a trailing edge 18 defined by the direction of motion of blade 10 as it rotates about a wind turbine's hub. During such rotation, one portion 20 of blade 10 is known as the high-pressure side or face of blade 10, while the other portion 22 of blade 10 is known as the low-pressure side or face of blade 10. All of the above description recites well-known terms and principles in the wind turbine art.

In accordance with the present invention, blade 10 is defined by a hollow-body construction. That is, blade 10 is an exoskeleton structure that can be manufactured, for example, as a composite structure made using well-known material lay-up and curing fabrication techniques. For example, a blade of the present invention could be fabricated using low cost materials like fiberglass. The blade's outer skin could be fabricated by draping fiberglass material over a lay-up tool in the region that will ultimately become the blade's leading edge 16 with the fiberglass material then extending to cover the entire lay-up tool to thereby define portions 20 and 22 up to what will ultimately become the blade's trailing edge 18. The process is repeated from root 12 to tip 14 of the blade. Additional load bearing composite material in the form of, for example, rectangular plies can be draped during the lay-up process at the portion of the blade that will ultimately become leading edge 16.

Regardless of the fabrication technique used to construct blade 10, its exoskeleton or hollow body will cause portions 20 and 22 to be in contact with one another at trailing edge 18. However, unlike conventional blades, portions and 22 are not coupled, joined, bonded or integrated with one another at trailing edge 18. That is, portions 20 and 22 are in an uncoupled contact relationship with one another at trailing edge 18. As a result, when blade 10 experiences torsional loads that cause blade 10 to twist along its span, portions 20 and 22 can experience relative movement there between along trailing edge 18 (i.e., along the span of blade 10) as indicated by opposing arrows 24 and 26, respectively. It is to be understood that the directions of relative movement 24 and 26 are dependent on whether blade 10 twists into portion 20 or into portion 22.

Blade 10 with its uncoupled trailing edge 18 prevents torsional (or twist) movement-based shear loads from being transferred through the blade's trailing edge 18. Instead, the uncoupled contact trailing edge 18 redirects all of the torsional or twist energy through the leading edge as a "spring" load. The exoskeleton or hollow-body blade 10 simplifies the uncoupling contact at trailing edge 18 while also maximizing the blades ability to redirect and distribute the torsional loads by allowing portions 20 and 22 to slide or slip relative to one another across the entire span of trailing edge 18 from root 12 to tip 14 regardless of which way blade 10 is twisting. Accordingly, the relative movement of portions 20 and 22 is easily accomplished and repeated during a blade's cyclic motion experienced as the blade rotates around a hub to which it is coupled.

The uncoupled contact between portions 20 and 22 permitting the above-described movements 24/26 can be realized in a variety of ways without departing from the scope of the present invention. By way of non-limiting and illustrative examples, FIGS. 2A-2C present three types of trailing edge configurations in cross-sectional views of a blade constructed in accordance with the present invention. Referring first to FIG. 2A, portion 22 is configured to include an open channel 220 at trailing edge 18 with the outboard edge 200 of portion 20 all along trailing edge 18 fitting within open-channel 220 such that movements 24/26 are supported. In FIG. 2B, portion 20 is configured to include a planar region 202 all along trailing edge 18 to form a planar region of contact with a planar region 222 of portion 22 all along trailing edge 18. In FIG. 2C, outboard edges 204 and 224 of portions 20 and 22, respectively, are configured for uncoupled tangential contact along trailing edge 18.

Referring now to FIG. 3, a plan view of blade 10 shows it configured with the above-described FIG. 2A type of uncoupled contact at all of its trailing edge 18. As described above, the trailing edge's uncoupled contact extends from root 12 to tip 14. Blade portions 20 and 22 are integrated with one another at all (i.e., 100%) of leading edge 16, but are not coupled to one another at tip 14 as illustrated in FIG. 4.

Another embodiment of the present invention is illustrated in FIGS. 5 and 6 where the illustrated blade is configured with its entire trailing edge 18 having the uncoupled contact relationship described above and shown in FIG. 2A. Blade portions 20 and 22 are integrated with one another at substantially all of leading edge 16, but are in coupled contact near and at tip 14. In the illustrated embodiment and as best seen in FIG. 6, the open channel type of uncoupled contact (FIG. 2A) at trailing edge 18 is continued around tip 14. More specifically, open channel 220 wraps around tip 14 and terminates at a point on leading edge 16 just in board of tip 14 at which point blade portions 20 and 22 are integrated with one another back to root 12.

In general, open channel 220 can wrap around at tip 14 and extend to a point along the blade's leading edge that is up to 10% of the entire span length of the blade. Said another way, a blade's leading edge must have its blade portions 20 and 22 integrated with one another along at least 90% of the blade's span length beginning at the blade's root. This is illustrated in the embodiment shown in FIGS. 7 and 8 where the open channel 220 extends all along trailing edge 18, wraps around tip 14, and extends along leading edge 16 to a point "P". The point P must be located such that at least 90% of the blade's span length where portions 20 and 22 are integrated at leading edge 16 is between root 12 and point P.

Blades constructed in accordance with the present invention must be connected to a rotating hub. To facilitate such a connection, a mounting support can serve as a link between a blade's root and a rotating hub. An embodiment of such a mounting support is illustrated in FIG. 9 where the delineation between a mounting support 30 and root 12 is indicated by a dashed line 32. Since blade 10 and mounting support 30 will rotate in unison, mounting support 30 has a loading edge 36 that continues from leading edge 16, and has a trailing edge 38 that continues from trailing edge 18. Mounting support 30 includes a first support portion 40 and a second support portion 42. First support portion 40 is integrated with and extends from blade portion 20, and second support portion 42 is integrated with and extends from blade portion 22 (not visible in FIG. 9). In general and similar to blade 10, portions 40 and 42 are integrated with one another at leading edge 36, but are in an uncoupled contact relationship with one another at trailing edge 38. For example, portion 40 can be configured to include an open channel 400 at trailing edge 38 with the outboard edge 420 fitted within open channel 420 such that sliding movement between portions 40 and 42 along trailing edge 38 is supported. As will be explained further below, the uncoupled contact relationship between portions 40 and 42 is not altered when mounting support 30 is coupled to a hub. Mounting support 30 can be fabricated along with blade 10 using well-known lay-up and curing techniques.

In the illustrated embodiment, the open channel configuration of uncoupled contact transitions from being constructed using the high pressure side of mounting support 30 (i.e., open channel 400 constructed as a continuation of portion 40) to using the low pressure side of blade 10 (i.e., open channel 220 constructed as a continuation blade portion 22). The advantage of this construction is that it allows the high pressure portion of the blade (i.e., blade portion 20) to move inboard without interacting with the low pressure portion of the blade (i.e., blade portion 22) at the blade's root.

Figure 10:
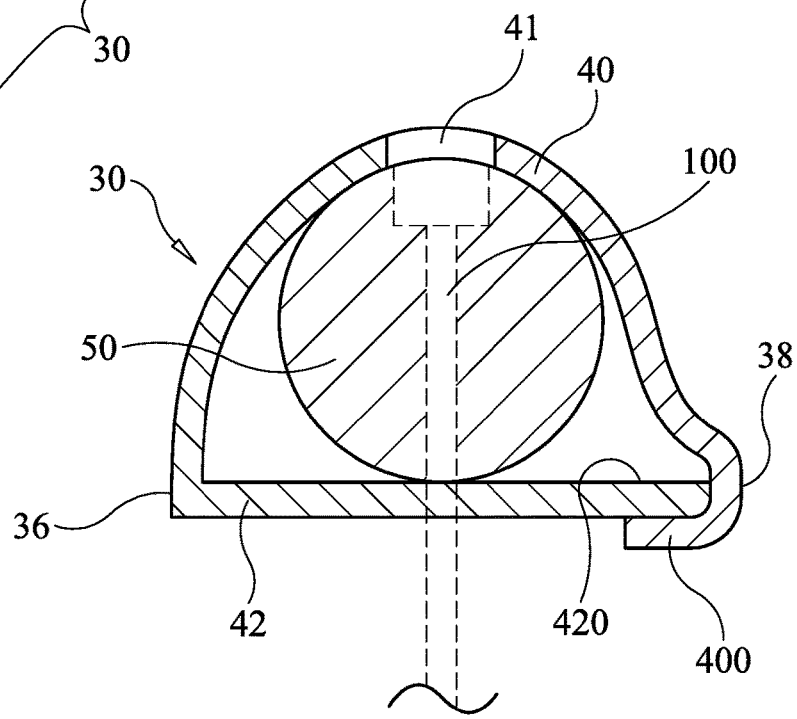
FIG. 10 is a cross-sectional view of the hollow mounting support shown in FIG. 9 with a rigid support disposed therein for coupling to a hub of a wind turbine in accordance with an embodiment of the present invention.

Referring now to the cross-sectional view presented in FIG. 10, mounting support 30 is illustrated with a rigid rod 50 passing there through. Rod 50 provides a rigid support for support 30 and supports one or more fasteners 100 passing fully through portion 40 (via clearance holes 41) before engaging rod 50 and portion 42, and then into a hub 102 so that the blade is secured thereto. In this way, rod 50 with fasteners 100 does not engage portion 40 or alter the uncoupled contact relationship between portions 40 and 42 at trailing edge 38.

Figure 11:
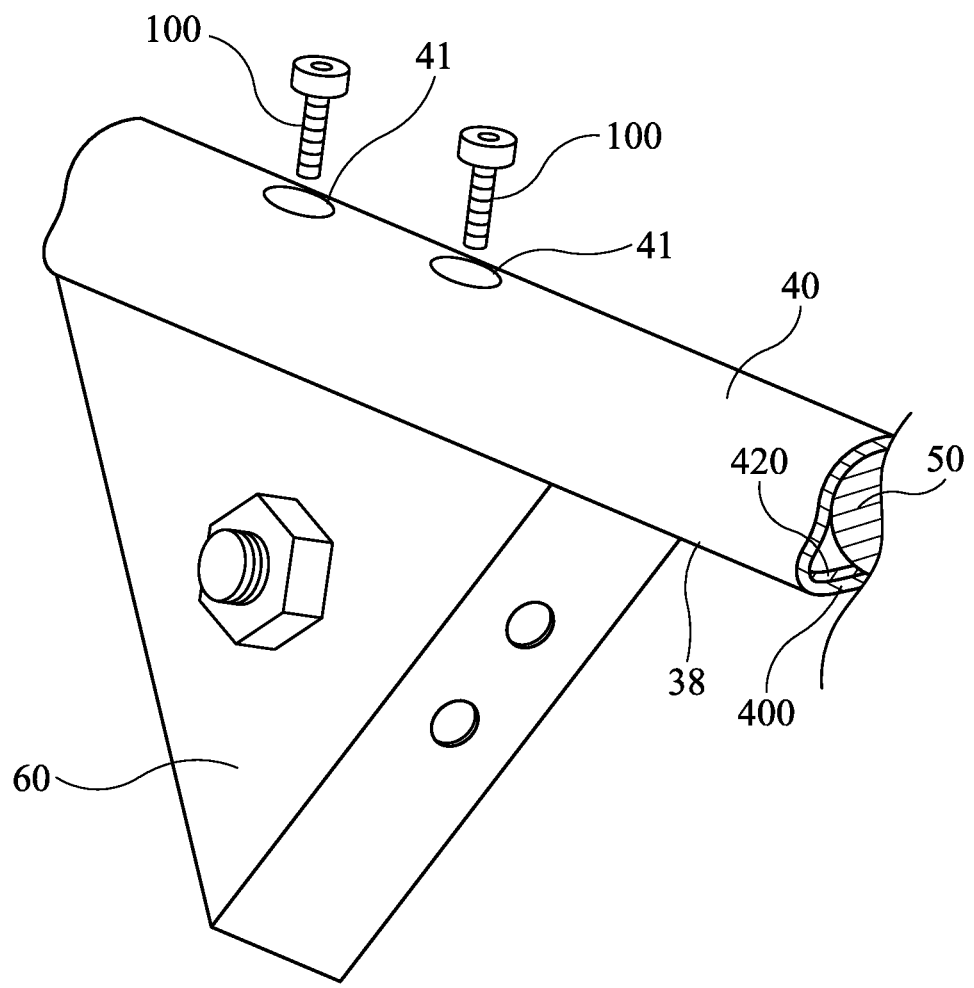
FIG. 11 is a perspective view of a triangular hub mount with a single blade coupled thereto in accordance with an embodiment of the present invention.

Referring now to FIG. 11, a single blade of the present invention has its mounting support 30 and rod 50 coupled to a triangular hub mount 60. The triangular shape of the hub mount allows the mechanical attachments (e.g., fasteners 100) to interact only with the low pressure half of the blade surface. This will allow the high pressure side of the blade's training edge that is not restricted by mechanical fasteners to oscillate inboard to outboard in a cyclic motion in accordance with the blade's cycle twist. Drilling clearance holes in the high pressure surface of the mounting support will allow the bolts to pass through this surface thereby permitting the cyclic motion to start at the root end of the blade and travel down to the tip to pitch the blade as the blade rotates around the hub.

The advantages of the present invention are numerous. The uncoupled contact at the blade's trailing edge reduces torsional loads normally transmitted into a blade's trailing edge as it undergoes cyclic twist during rotation. More specifically, the blade's unique construction redirects the oscillating load path (generated during blade rotation) entirely through the lead edge from the high pressure portion of the blade to the low pressure portion of the blade and back again. By directing the load path through the blade's leading edge and not through the blade's trailing edge, the blade will act more like a spring than a confined box that is shaped like a conventional wing having high and low pressure surfaces coupled along its trailing edge. Instead of fatigue stress loads traveling through the blade, the loads translate to harmless oscillating inboard-to-outboard or side-to-side motion as the trailing edge slide in a channel the length of the trailing edge. The blade's design lends itself to solid, co-cure lay-up techniques that require no bonded components or adhesives. The blade and its operations advantages are achieved totally autonomously using gravity-induced, cyclic oscillating blade pitch mode. The hollow or exoskeleton design provides a lighter blade that requires no interior core elements. The blade's cyclic oscillating blade pitch mode means the falling-blade portion of the rotation cycle is in a streamline state to reduce the blade's noise signature.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A blade for a wind turbine, comprising an exoskeleton blade body having a leading edge and a trailing edge along a span of said blade body, said blade body having a first blade portion and a second blade portion wherein said first blade portion and said second blade portion are integrated with one another along at least 90% of said leading edge, and wherein said first blade portion and said second blade portion are in unbonded and non-integrated contact at said trailing edge for supporting relative movement between said first blade portion and said second blade portion all along said span of said blade body at said trailing edge when said blade body twists wherein, when oscillating torsional loads are generated as said blade body undergoes cyclic twisting, said unbonded and non-integrated contact causes said oscillating torsional loads to be directed through said leading edge and not through said trailing edge.

2. The blade as in claim 1, further comprising a hollow mounting support integrated with a root of said blade body, said hollow mounting support having a first support portion extending from said first blade portion and having a second support portion extending from said second blade portion, wherein said first support portion and said second support portion are integrated where extending from said leading edge, and wherein said first support portion and said second support portion are in contact with one another where extending from said trailing edge for supporting sliding movement there between when said blade body twists.

3. The blade as in claim 2, further comprising a rigid support disposed in at least a portion of said hollow mounting support, said rigid support and said hollow mounting support adapted to be coupled to a hub of a wind turbine wherein said first support portion and said second support portion remain in said contact with one another where extending from said trailing edge for supporting sliding movement there between when said blade body twists.

4. The blade as in claim 1, wherein said first blade portion and said second blade portion are integrated with one another along 100% of said leading edge.

5. The blade as in claim 1, wherein said at least 90% of said leading edge is a first contiguous region of said leading edge extending from a root of said blade body, wherein a second contiguous region of said leading edge extends from said first contiguous region to a tip of said blade body, and wherein said first blade portion and said second blade portion are in contact with one another at said second contiguous region and at said tip of said blade body for supporting sliding movement there between when said blade body twists.

6. A blade for a wind turbine, comprising a hollow blade-shaped body having a root and a tip, said blade-shaped body having a leading edge and a trailing edge wherein said leading edge and said trailing edge extend from said root to said tip, said blade-shaped body having a first blade portion and a second blade portion wherein said first blade portion and said second blade portion are integrated at said leading edge and are in unbonded and non-integrated contact at said trailing edge for supporting relative movement between said first blade portion and said second blade portion all along said span of said blade body along all of said trailing edge when said blade body twists wherein, when oscillating torsional loads are generated as said blade body undergoes cyclic twisting, said unbonded and non-integrated contact causes said oscillating torsional loads to be directed through said leading edge and not through said trailing edge.

7. The blade as in claim 6, further comprising a hollow mounting support integrated with and extending from said root, said hollow mounting support having a first support portion extending from said first blade portion and having a second support portion extending from said second blade portion, wherein said first support portion and said second support portion are integrated where extending from said leading edge, and wherein said first support portion and said second support portion are in contact with one another where extending from said trailing edge for supporting sliding movement there between when said blade body twists.

8. The blade as in claim 7, further comprising a rigid support disposed in at least a portion of said hollow mounting support, said rigid support and said hollow mounting support adapted to be coupled to a hub of a wind turbine wherein said first support portion and said second support portion remain in said contact with one another where extending from said trailing edge.

9. The blade as in claim 6, wherein said first blade portion and said second blade portion are in contact with one another at said tip of said blade body for supporting sliding movement there between when said blade body twists.

10. A blade for a wind turbine, comprising a hollow blade-shaped body having a root and a tip, said blade-shaped body having a leading edge and a trailing edge wherein said leading edge and said trailing edge extend from said root to said tip, said blade-shaped body having a first blade portion and a second blade portion wherein said first blade portion and said second blade portion are integrated with one another along at least 90% of said leading edge and are in an unbonded and non-integrated contact relationship at said trailing edge, said blade-shaped body adapted to be coupled to a hub of a wind turbine wherein said first body portion and said second body portion remain in said unbonded and non-integrated contact relationship at said trailing edge for supporting relative movement between said first blade portion and said second blade portion all along said span of said blade body along all of said trailing edge when said blade body twists wherein, when oscillating torsional loads are generated as said blade body undergoes cyclic twisting, said unbonded and non-integrated contact relationship causes said oscillating torsional loads to be directed through said leading edge and not through said trailing edge.

11. The blade as in claim 10, wherein said blade-shaped body includes a hollow mounting support integrated with and extending from said root, said hollow mounting support having a first support portion extending from said first blade portion and having a second support portion extending from said second blade portion, wherein said first support portion and said second support portion are integrated where extending from said leading edge and wherein said first support portion and said second support portion are in contact with one another where extending from said trailing edge for supporting sliding movement there between when said blade body twists.

12. The blade as in claim 11, further comprising a rigid support disposed in at least a portion of said hollow mounting support, said rigid support and said hollow mounting support adapted to be coupled to a hub of a wind turbine wherein said first support portion and said second support portion remain in said contact with one another where extending from said trailing edge.

13. The blade as in claim 10, wherein said first blade portion and said second blade portion are integrated with one another along 100% of said leading edge.

14. The blade as in claim 10, wherein said at least 90% of said leading edge is a first contiguous region of said leading edge extending from said root of said blade body, wherein a second contiguous region of said leading edge extends from said first contiguous region to said tip of said blade body, and wherein said first blade portion and said second blade portion are in contact with one another at said second contiguous region and at said tip of said blade body for supporting sliding movement there between when said blade body twists.

* * * * *